United States Patent [19]

Lee

[11] Patent Number: 4,570,107
[45] Date of Patent: Feb. 11, 1986

[54] LIGHTING CONTROL DEVICE

[76] Inventor: Yong J. Lee, Namdo-Yeonlip-Ka-dong No. 206 of 28-1, Cheongdam-dong, Kanguam-ku, Seoul, Rep. of Korea

[21] Appl. No.: 563,844

[22] Filed: Dec. 21, 1983

[51] Int. Cl.$^4$ .............................................. H05B 37/00
[52] U.S. Cl. .................................. 315/200 R; 315/199; 315/208; 315/DIG. 4
[58] Field of Search ............... 315/53, 72, 199, 200 R, 315/208, DIG. 4

[56] References Cited

U.S. PATENT DOCUMENTS

| 1,830,531 | 11/1931 | Dubilier | 315/DIG. 4 |
| 2,981,866 | 4/1961 | Tsien et al. | 315/DIG. 4 |
| 3,028,525 | 4/1962 | Morton | 315/200 R |
| 3,452,215 | 6/1969 | Alessio | 315/199 |
| 3,836,814 | 9/1974 | Rodriquez | 315/200 R |
| 4,348,612 | 9/1982 | Morton | 315/72 |

Primary Examiner—Harold Dixon
Attorney, Agent, or Firm—Jones, Tullar & Cooper

[57] ABSTRACT

A lighting control device is incorporated in an electric bulb socket (FIG. 2) and uses a rotary switch 2 to connect a mains terminal 10 to the bulb via a direct link, a diode 6 or a triac-diac circuit 4,5 R,$C_2$ to provide different levels of illumination.

5 Claims, 2 Drawing Figures

LIGHTING CONTROL DEVICE

BACKGROUND OF THE INVENTION

The present invention relates to a lighting control device usable to control the level of illumination produced by a conventional electric incandescent lamp or bulb.

Known lighting control devices or dimmer switches employ a variable resistor or selected resistors to adjust the power supplied to a bulb. The use of resistors naturally results in power loss, generates heat and involves a bulky device. Other arrangements have employed a special bulb with several incandescent filaments with different illumination powers. Such bulbs are however costly.

There is thus a need for an improved lighting control device.

SUMMARY OF THE INVENTION

According to the present invention there is provided a lighting control device comprising a pair of terminals for connection to an electric a.c. power source and a selector switch connectible to one of said terminals via one of a plurality of selective connections, an incandescent light source being connectible between the switch and the other of said terminals; wherein the selective connections at least include a direct connection, a series diode and a circuit including a triac and diac providing respectively a higher, intermediate and a lower level of illumination from the source.

The device can form an exceptionally compact package and can be built into a conventional type of light bulb socket. Thus in another aspect the invention provides a lighting control device for incorporation in the socket of a light bulb to control the level of illumination therefrom, said device comprising a switch accessible from the exterior of the socket which serves selectively to connect the bulb to an a.c. power source during use through different circuit connections, one of which comprises a direct connection and others of which incorporate semi-conductor devices.

The invention may be understood more readily, and various other aspects and features of the invention may become apparent, from consideration of the following description.

BRIEF DESCRIPTION OF THE DRAWINGS

An embodiment of the invention will now be described, by way of example only, with reference to the accompanying drawing, wherein.

DESCRIPTION OF PREFERRED EMBODIMENT

Figure 1:
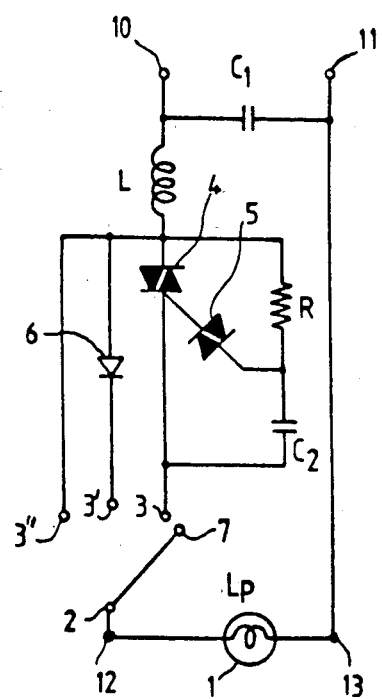
FIG. 1 is a schematic circuit diagram depicting a device constructed in accordance with the invention.

As shown in FIG. 1, a lighting control device comprises terminals 10, 11 which are intended to be connected to an electric a.c. mains supply and terminals 12, 13 which are intended to be connected to a light source $L_p$ in the form of an incandescent light bulb 1. A selector switch 2 has a common terminal or wiper 7 connected to the terminal 12 and three selection terminals 3, 3', 3''. A capacitor $C_1$ is connected across the terminals 10, 11 and an inductor L is connected in series with a triac 4 between terminals 3 and 10. A resistor R and a capacitor $C_2$ are connected in series across the triac 4. A diac 5 is connected between the control electrode of the triac 4 and the junction between the resistor R and the capacitor $C_2$. A diode 6 is connected between the terminal 3' and the inductor L and the terminal 3'' is connected directly to the inductor L. The inductor L and the capacitor $C_1$ serve as a smoothing network.

The switch 2 can select one of three alternative circuit connections to energize the light bulb 1. The highest level of illumination occurs when the switch 2 selects the terminal 3'' with the direct connection to the terminal 10. The next highest level of illumination occurs when the switch 2 selects the terminal 3' so that the diode 6 provides half-wave rectified power to the bulb 1. The lowest level of illumination occurs when the switch 2 selects the terminal 3. In this case the triac 4 is triggered into conduction by the diac 5 in dependence on the time constant $C_2R$.

Figure 2:
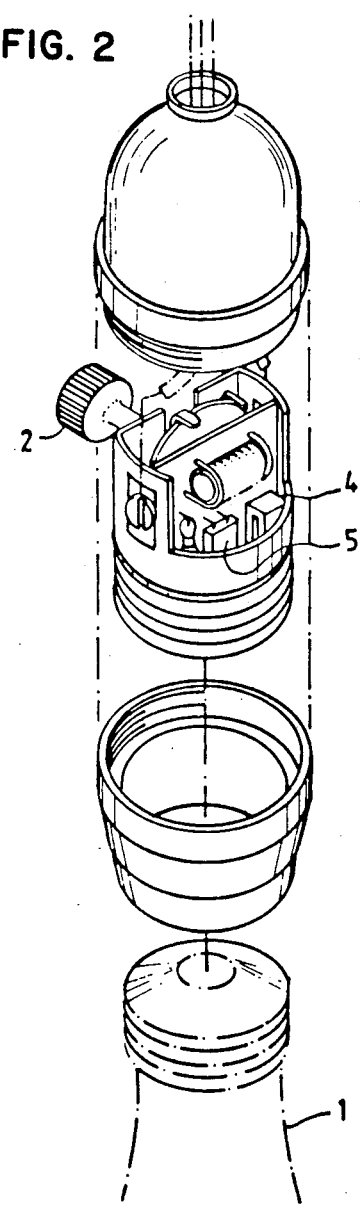
FIG. 2 is a perspective view of a light socket embodying the device of FIG. 1.

FIG. 2 shows how the compact control device can be assembled into a light bulb socket.

I claim:

1. A lightning control device comprising a pair of terminals for connection to an electric a.c. power source and a selector switch connectable to one of said terminals via one of a plurality of selective connections, an incandescent light source being connectable between the switch and the other of said terminals; wherein the selective connections at least include a direct connection, a series diode, and a circuit including a triac and diac providing, respectively, a higher, an intermediate, and a lower level of illumination from the light source, wherein a capacitor is connected across said pair of terminals, and wherein an inductor is connected to said one terminal and is incorporated in each of said selective connections.

2. A control device according to claim 1, wherein the switch is a manually-operable rotary selector switch.

3. A control device according to claim 1, wherein said circuit is composed of said triac in series between said selector switch and said one terminal, a resistor and a capacitor connected in series across said triac, and said diac connected between the control electrode of the triac and the junction between the resistor and the capacitor.

4. An electric light fixture, including
    socket means for receiving an incandescent light source;
    control means mounted in said socket means, said control means including:
    (a) a first terminal for connection to an electric a.c. power source;
    (b) a second terminal for connection to said socket means;
    (c) plural connection means including a third terminal, a first connection directly to said third terminal, a second connection through a series diode to said third terminal, and a third connection through a circuit to said third terminal;
    filter means connected between said first terminal and said third terminal;
    selector switch means cooperating with said plural connection means to selectively connect said second terminal through one of said first, second or third connections in said control means to said third terminal to provide, respectively, a higher, an intermediate, and a lower level of illumination from an incandescent light source mounted in said socket means; and said circuit means comprising a triac connectable in series between said selector switch means and said third terminal, a resistor and a first capacitor connected in series across said triac, and a diac connected between the control electrode of said triac and the junction between said resistor and said first capacitor.

5. A control device according to claim 4, wherein said filter means includes a second capacitor connected to said first terminal and an inductor connected between said first terminal and said third terminal of said plural connection means, said inductor being in series with each selected connection of said plural connection means.

* * * * *